United States Patent Office 2,751,187
Patented June 19, 1956

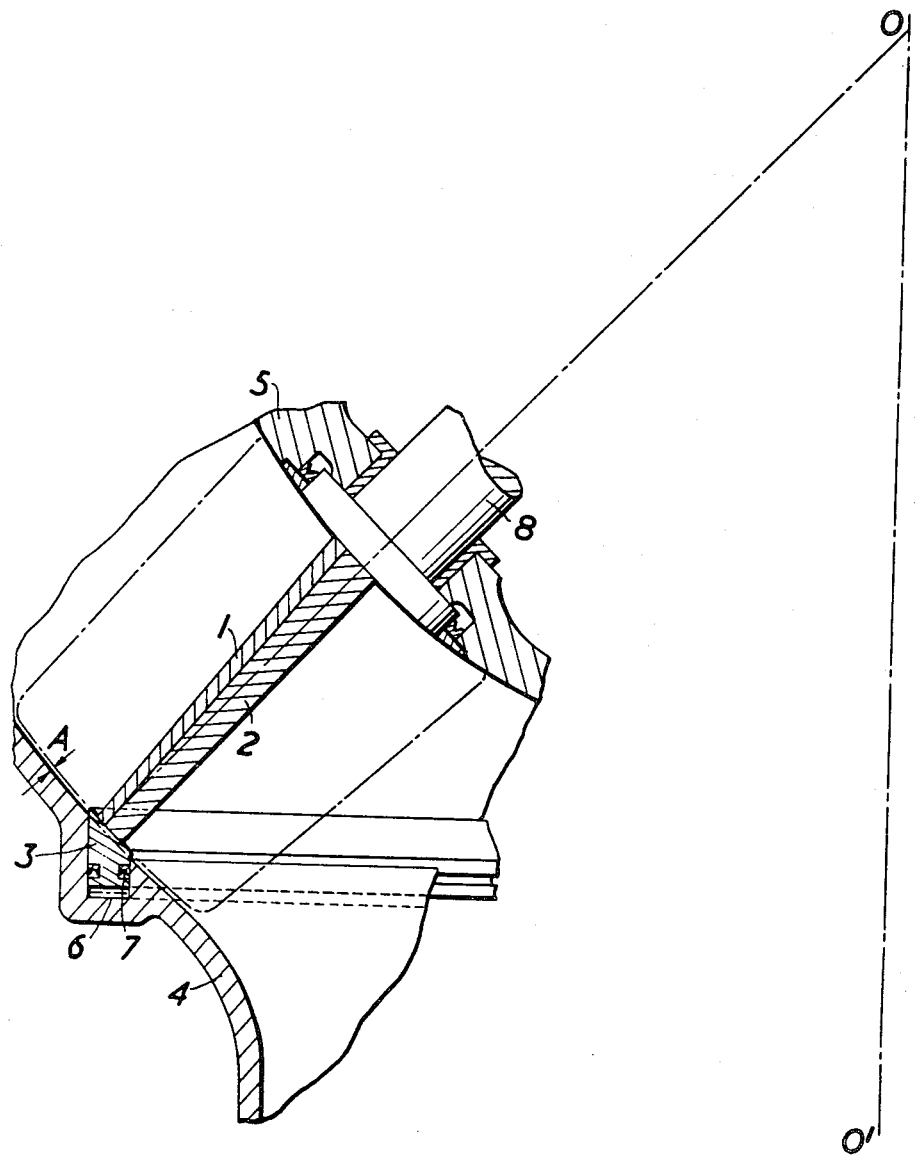

2,751,187

FEATHERING RUNNER VANE TYPE HYDRAULIC TURBINES AND PUMPS

Paul Dériaz, Rugby, England, assignor to The English Electric Company Limited, London, England, a British company Application November 22, 1954, Serial No. 470,445

Claims priority, application Great Britain December 8, 1953

3 Claims. (Cl. 253—31)

The invention relates to rotary hydraulic flow reaction machines of the feathering runner vane type, i. e. hydraulic turbines and pumps, which have the trunnion axes of the feathering runner vanes converging in a point on the axis of rotation, and which can be operated by the reversal of flow (and preferably also of rotation) alternately as turbines and as pumps. Such machines will be referred to for brevity as "hydraulic machines of the kind described."

In hydraulic machines of the kind described it is possible to design the runner vanes in such a manner that the trailing ends of the blades closely contact a portion of the adjacent blades in the fully closed condition, so that a practically tight closure could be formed if it were possible to provide a tight closure also at the roots and at the tips of the runner vanes. While this is possible without difficulty at the roots where the vanes perform merely an adjustment movement about their trunnion axes relative to the rotor body, a substantial clearance is required at the tips between the rotating vanes and the stationary casing of the hydraulic machine, both in turbine and pumping operation, to allow for slight axial movements of the runner relative to the stationary part of the machine.

According to the present invention a seating ring is provided in the stationary casing of a hydraulic machine of the kind described, opposite the tips of the runner vanes in their closed position, which seating ring during turbine and pumping operation is retracted into the said casing to provide the clearance required, and which at a standstill of the runner can be brought into contact with the tips of the runner vanes so as to provide a seal there.

The said seating ring is preferably axially slidable in an annular recess of the stator casing opposite the tips of the runner vanes in their closed position, and can be shifted mechanically or hydraulically from the clearance position to the sealing position and vice versa. It can be made of a suitable metal, plastic material or rubber, and in the latter case can be inflated hydraulically or pneumatically into the sealing position and collapsed into the clearance position, without being moved bodily.

In order that the invention may be clearly understood and readily carried into effect, an embodiment thereof will now be described by way of example with reference to the accompanying drawing which is a diagrammatic longitudinal part section of a hydraulic machine of the kind described.

In the runner body 5 the trunnions 8 of the runner vanes are pivoted, the axes of the said trunnions converging in a point O of the axis of rotation O—O' of the said runner body. Two adjacent runner vanes 1, 2 are shown in section in full lines in the closed position in which the comparatively thin trailing portion of a runner vane 1 contacts the comparatively thick middle (or leading) portion of the vane 2, the trunnion 8 of which vane 1 has its axis outside the plane of the drawing.

The roots of the runner vanes and the runner body 5 are shaped as part-spherical surfaces having the common centre O and fitting one another as closely as possible to allow adjustment movement of the vanes about their respective trunnion axes.

The stator casing 4 and the tips of the runner vanes are also made of part-spherical shape with the common centre O, but here a substantial clearance A is required between the tips of the runner vanes shown in chain dotted lines moving at great circumferential speed both in turbine and in pumping operation and the stationary casing 4.

In an annular cylindrical recess 6 of the stator casing 4 opposite the tips of the runner vanes 1, 2 in their closed position a seating ring 3 is housed which both in turbine and in pumping operation is retracted to the clearance position shown in chain dotted lines in which it is flush with the surface of the stationary casing 4.

When the machine is at a standstill with the runner vanes fully closed, the seating ring 3 can be raised by any suitable hydraulic or mechanical means into the sealing position shown in full lines, in which it tightly bears on the tips of the runner vanes 1, 2.

A packing or gland 7 may be provided on the bore and/or outside of the seating ring 3, and the raising of the said seating ring 3 may be effected by applying hydraulic pressure to the annular space enclosed between the said seating ring 3 and the bottom of the annular recess 6.

Alternatively the said seating ring could be moved mechanically, for example through a wedge ring or by means of vertical servo-motors. The seal 7 can be omitted if desired.

The arrangement according to the invention is of importance in that as the runner vanes themselves now are providing a tight closure it permits to dispense with a large and expensive valve in the main stream of the machine of the kind described which valve would have to be closed any time the machine is at rest. Considerable saving in equipment and operation costs can thus be attained.

While I have herein described and illustrated in the accompanying drawing what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent is:

1. A hydraulic machine of the kind described, comprising in combination: a stationary casing, a runner rotatably mounted in the said casing, runner vanes pivoted in the said runner about axes converging in a point of the axis of rotation of the said runner having a closed position obturating the flow through the said machine, in the closed position contacting one another in the manner of a frusto-conical shutter and with their tips being clear of the said casing, and a sealing ring mounted on the said casing opposite the said tips of the runner vanes in their closed position the said ring having a sealing position tightly contacting said vane tips, and an inoperative position clearing the said tips.

2. A hydraulic machine of the kind described, comprising in combination: a stationary casing, a runner rotatably mounted in the said casing, runner vanes pivoted in the said runner about axes coverging in a point of the axis of rotation of the said runner having a closed position obturating the flow through the said machine, in the closed position contacting one another in the manner of a frusto-conical shutter and with their tips being clear of the said casing, and a sealing ring of rigid material mounted slidably in the axial direction in an annular recess of the said casing opposite the said tips of the runner vanes in their closed position, having a projected position in which it contacts and makes seal with the said tips in the closed position of the said runner vanes, and a retracted position in which it keeps clear of the said tips.

3. A hydraulic machine of the kind described comprising in combination: a stationary casing, a runner rotatably mounted in the said casing, runner vanes pivoted in the said runner about axes converging in a point of the axis of rotation of the said runner having a closed position obturating the flow through the said machine, in the closed position contacting one another in the manner of a frusto-conical shutter and with their tips being clear of the said casing, and a sealing ring of resilient material mounted in the said casing opposite the said tips of the runner vanes in their closed position, having an expanded position in which it contacts and makes seal with the said tips in the closed position of the said runner vanes, and a retracted position in which it keeps clear of said tips.

References Cited in the file of this patent

UNITED STATES PATENTS

| | | |
|---|---|---|
| 1,694,481 | Moody | Dec. 11, 1928 |
| 2,045,918 | Moody | June 30, 1936 |

FOREIGN PATENTS

| | | |
|---|---|---|
| 496,261 | France | July 28, 1919 |